United States Patent
Yatagiri et al.

(10) Patent No.: US 11,734,664 B2
(45) Date of Patent: Aug. 22, 2023

(54) REMOTE SELF-CHECKOUT

(71) Applicant: Target Brands, Inc., Minneapolis, MN (US)

(72) Inventors: Amit Yatagiri, Minneapolis, MN (US); John Gillis, Minneapolis, MN (US); Annamalai Muthalagappan, Minneapolis, MN (US); Dhileepan Chitradevi Raju, Hopkins, MN (US); Karthic S. Raj, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/220,696

(22) Filed: Apr. 1, 2021

(65) Prior Publication Data
US 2022/0076225 A1    Mar. 10, 2022

Related U.S. Application Data

(60) Provisional application No. 63/076,731, filed on Sep. 10, 2020.

(51) Int. Cl.
*G06Q 20/20* (2012.01)
*G06Q 20/10* (2012.01)
(Continued)

(52) U.S. Cl.
CPC ......... *G06Q 20/208* (2013.01); *G06Q 20/108* (2013.01); *G06Q 20/3223* (2013.01);
(Continued)

(58) Field of Classification Search
CPC ............. G06Q 20/208; G06Q 20/3276; G06Q 30/0633; G06Q 30/0641
See application file for complete search history.

(56) References Cited

U.S. PATENT DOCUMENTS 6,598,791 B2    7/2003    Bellis et al.
6,910,697 B2    6/2005    Varatharajah et al.
(Continued)

FOREIGN PATENT DOCUMENTS

WO    2016059486 A1    4/2016

OTHER PUBLICATIONS

Lucas, Peter, Putting Self-Checkout on a Mobile Device, Nov. 1, 2015, 4 Pages.

*Primary Examiner* — Florian M Zeender
*Assistant Examiner* — Vanessa Deligi
(74) *Attorney, Agent, or Firm* — Merchant and Gould, PC

(57) ABSTRACT

Methods and systems for remote self-checkout are described. One method includes presenting a code at a self-checkout point-of-sale device that may be captured by a user (e.g., a store customer or a store employee) mobile device. The code may enable the mobile device to request a connection with the self-checkout point-of-sale device that allows for user interactions associated with a self-checkout session to be performed at the self-checkout point-of-sale device or at the mobile device. The self-checkout session includes adding items to be purchased into a cart instance and receiving payment for items in the cart instance. User interactions associated with weighed items may be performed on the mobile device in a manner integrated with a scale/scanner portion of the self-checkout point-of-sale device to avoid user contact with a touchpoint of the self-checkout point-of-sale device. Accordingly, contact with a self-checkout point-of-sale device by all users may be reduced.

21 Claims, 11 Drawing Sheets

(51) Int. Cl.
  *G06Q 30/0601*     (2023.01)
  *G06Q 20/32*       (2012.01)
(52) U.S. Cl.
  CPC ..... *G06Q 20/3276* (2013.01); *G06Q 30/0633* (2013.01); *G06Q 30/0641* (2013.01)

(56) References Cited

U.S. PATENT DOCUMENTS

| | | | |
|---|---|---|---|
| 8,352,323 B2 | 1/2013 | Fisher | |
| 8,600,883 B2 | 12/2013 | Wong | |
| 9,269,083 B1 | 2/2016 | Jarajapu et al. | |
| 9,361,501 B2 | 6/2016 | Molisimo et al. | |
| 9,514,455 B2 | 12/2016 | Jarajapu et al. | |
| 10,102,514 B2 | 10/2018 | Laracey | |
| 10,121,133 B2 | 11/2018 | Nelms et al. | |
| 10,192,210 B2 | 1/2019 | Baig | |
| 10,664,819 B1* | 5/2020 | Zafar | G06Q 20/322 |
| 2003/0120547 A1 | 6/2003 | Walter et al. | |
| 2012/0284130 A1* | 11/2012 | Lewis | G06Q 40/00 705/16 |
| 2012/0330769 A1* | 12/2012 | Arceo | G06Q 20/4014 455/411 |
| 2013/0097039 A1* | 4/2013 | Czapla | G07G 3/006 705/16 |
| 2013/0254114 A1 | 9/2013 | Smith | |
| 2014/0074605 A1* | 3/2014 | Sanchez | G06Q 40/03 705/14.64 |
| 2014/0164237 A1* | 6/2014 | Blanco | G06Q 20/202 705/44 |
| 2014/0333509 A1* | 11/2014 | Yuann | G06F 1/1694 345/2.1 |
| 2014/0344041 A1 | 11/2014 | Yeleswarapu | |
| 2015/0088674 A1* | 3/2015 | Flurscheim | G06Q 20/326 705/17 |
| 2015/0120475 A1 | 4/2015 | Pedley et al. | |
| 2016/0292677 A1* | 10/2016 | Karlsson | G06Q 20/3276 |
| 2017/0091748 A1* | 3/2017 | Clark | G06Q 20/208 |
| 2017/0243190 A1* | 8/2017 | Kieffer | G06Q 20/3274 |
| 2019/0098504 A1* | 3/2019 | Van Betsbrugge | G06Q 10/0833 |
| 2019/0205874 A1* | 7/2019 | Hamid | G06Q 20/3278 |
| 2020/0027076 A1* | 1/2020 | Sharma | G06Q 20/3278 |
| 2020/0134588 A1 | 4/2020 | Nelms et al. | |
| 2020/0312101 A1* | 10/2020 | Wilson | G06Q 20/203 |
| 2021/0065153 A1* | 3/2021 | Wang | G06Q 20/4097 |
| 2021/0192902 A1* | 6/2021 | Sasaki | G06Q 20/204 |
| 2022/0005018 A1* | 1/2022 | White | G06Q 20/3278 |

* cited by examiner

REMOTE SELF-CHECKOUT

CROSS-REFERENCE TO RELATED APPLICATIONS

This application claims the benefit of U.S. Provisional Application No. 63/076,731, having the title of "REMOTE SELF-CHECKOUT" and the filing date of Sep. 10, 2020, which is incorporated herein by reference in its entirety.

BACKGROUND

In existing retail establishments, customers may often have an option to either check out at a point of sale device manned by a retail employee or to use a self-checkout station. A self-checkout station may include a scanner (to scan items for purchase), a display screen with a hard or soft keypad (to provide a user interface for displaying information and receiving user input), and a payment kiosk (to receive payment for the items purchased).

In some circumstances, use of either manned or self-checkout points of sale may not be desirable for customers. For example, in times in which highly communicable diseases are transmitted throughout the public (e.g., the COVID-19 pandemic, and the like) it is desirable to minimize interaction between two people, as well as minimize contact with devices (e.g., a self-checkout station) that may be touched by other customers. While current retail locations may attempt to ensure sanitization of self-checkout points of sale, customers may nevertheless lack confidence in the cleanliness or sanitization procedures of that retail location. Accordingly, techniques for reduction of a requirement to touch self-checkout devices are desirable.

SUMMARY

In general, methods and systems for providing remote self-checkout are described. A unique code may be generated and displayed at a self-checkout point-of-sale device that may be captured by a user (e.g., customer user or an employee user) mobile device. The code may enable the mobile device to request a connection with the self-checkout point-of-sale device that allows for user interactions associated with the self-checkout session to be performed at the self-checkout point-of-sale device or at the mobile device. The self-checkout session may include adding items to be purchased into a cart instance and receiving payment for items in the cart instance. In some examples, user interactions associated with items requiring at least a second input may be performed on the mobile device in a manner integrated with a scale/scanner portion of the self-checkout point-of-sale device to avoid user contact with a touchpoint (e.g., touchscreen, keypad) of the self-checkout point-of-sale device. In some examples, administrative user interactions associated with items or operations requiring administrative support may be performed on an administrative mobile device in a manner integrated with the self-checkout point-of-sale device to avoid additional user contact with a touchpoint of the self-checkout point-of-sale device. Accordingly, contact with a self-checkout point-of-sale device by all users may be reduced.

In one example aspect, a system for providing remote self-checkout is described, the system comprising: at least one processor; and a memory coupled to the at least one processor, the memory including instructions that when executed by the at least one processor cause the system to: display, on a display of a self-checkout point-of-sale (POS) device, a user interface including a unique coded image associated with a self-checkout session at the self-checkout POS device, that when captured by a user mobile computing device, enables the user mobile computing device to request a connection with the self-checkout POS device; in response to receiving a request for the connection with the self-checkout POS device, establish a first connection with the user mobile computing device and a second connection with the self-checkout POS device based on information embedded in the unique coded image; receive, from the self-checkout POS device, information associated with a state of a guest user cart instance in association with the self-checkout session; pass the information associated with the state of a guest user cart instance to the user mobile computing device; receive, from the user mobile computing device, information associated with a user interaction in association with the self-checkout session; pass the information associated with the user interaction to the self-checkout POS device to be processed, wherein processing the information associated with the user interaction causes the state of the guest user cart instance to be updated; and update the user interface displayed on the self-checkout POS device based on the updated state of the guest user cart instance.

In another example aspect, a method for providing remote self-checkout is described, comprising: displaying, on a display of a self-checkout point-of-sale (POS) device, a user interface including a unique coded image associated with a self-checkout session at the self-checkout POS device, that when captured by a user mobile computing device, enables the user mobile computing device to request a connection with the self-checkout POS device; in response to receiving a request for the connection with the self-checkout POS device, establishing a first connection with the user mobile computing device and a second connection with the self-checkout POS device based on information embedded in the unique coded image; receiving, from the self-checkout POS device, information associated with a state of a guest user cart instance in association with the self-checkout session; passing the information associated with the state of a guest user cart instance to the user mobile computing device; receiving, from the user mobile computing device, information associated with a user interaction performed at the user mobile computing device in association with the self-checkout session; passing the information associated with the user interaction to the self-checkout POS device to be processed, wherein processing the information associated with the user interaction causes the state of the guest user cart instance to be updated; and updating the user interface displayed on the self-checkout POS device based on the updated state of the guest user cart instance.

In another example aspect, a computer readable storage device is described that includes executable instructions which, when executed by a processor, cause the processor to provide remote self-checkout, the instructions comprising: displaying, on a display of a self-checkout point-of-sale (POS) device, a user interface including a unique coded image associated with a self-checkout session at the self-checkout POS device, that when captured by a user mobile computing device, enables the user mobile computing device to request a connection with the self-checkout POS device; in response to receiving a request for the connection with the self-checkout POS device, establishing a first connection with the user mobile computing device and a second connection with the self-checkout POS device; receiving, from the self-checkout POS device, information associated with a state of a guest user cart instance in association with the self-checkout session; passing the information associated with the state of a guest user cart instance to the user mobile computing device; receiving, from the user mobile computing device, information associated with a user interaction in association with the self-checkout session; passing the information associated with the user interaction to the self-checkout POS device to be processed, wherein processing the information associated with the user interaction causes the state of the guest user cart instance to be updated; and updating the user interface displayed on the self-checkout POS device based on the updated state of the guest user cart instance.

DETAILED DESCRIPTION

As briefly described above, embodiments of the present invention are directed to methods and systems for providing remote self-checkout.

One method includes presenting an identifier at a self-checkout point of sale device that may be captured by a user (e.g., a customer/guest user or an employee/administrative user) mobile computing device. The self-checkout point of sale device and the user mobile computing device may be linked to a guest user cart instance.

Scans of codes affixed to items to be purchased may then be performed using either the user mobile computing device or the self-checkout point of sale device, and payment may also be performed on either device. Additionally, confirmation or data entry associated with certain items (e.g., weighed goods (produce and the like), items that require user identification (ID) to be purchased (regulated items and the like), or other items that require at least a second input to be added to the user cart) may be performed on a user mobile computing device in a manner integrated with the self-checkout point-of-sale device to avoid user contact with a touchpad or other input interface of the self-checkout point-of-sale device. Still further, an administrative user (e.g., a store employee) may scan the same code as the customer user but may obtain administrative access on a separate mobile device to modify, cancel, or otherwise override transaction rules. Accordingly, contact with a self-checkout point of sale device by all users may be reduced.

Figure 1:
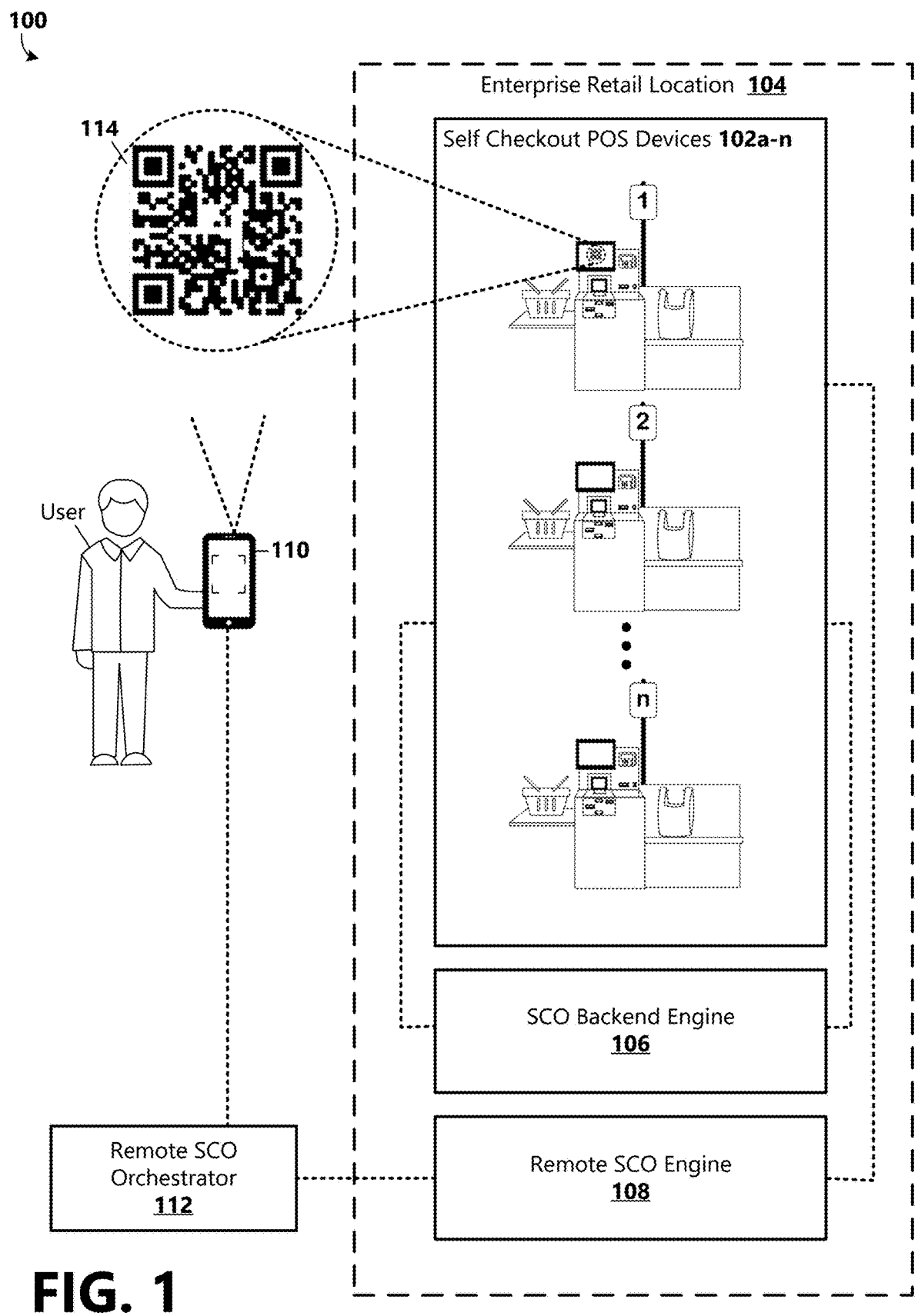
FIG. 1 is a diagram illustrating an example computing network within which aspects of the present disclosure may be implemented in an example implementation.

FIG. 1 is a diagram illustrating an example networked computing system 100 where aspects of the present disclosure may be implemented for providing remote self-checkout, referred to hereafter as a remote self-checkout system 100. In some examples, the remote self-checkout system 100 may be associated with an enterprise, such as a retail enterprise that offers goods and/or services, also referred to herein as items, directly to consumers. According to an aspect, the enterprise may be a retail enterprise that may include at least one retail location 104, such as a physical store where items are sold. In some examples, the enterprise may further include an online sales channel through which items are sold. Additionally, the enterprise may be further comprised of other enterprise divisions, such as a headquarters and one or more operation centers (e.g., inventory receive centers, flow centers). Although examples are presented primarily regarding the retail industry, these are presented as non-limiting examples, as enterprises in other goods, services, healthcare, educational, professional, and other industries may also make use of the present disclosure.

As described in the Background Section above, in some circumstances, use of either manned or self-checkout point-of-sale devices may not be desirable for users (e.g., customers (herein referred to as guest users) or employees (herein referred to as administrative users)). For example, in times in which highly communicable diseases are transmitted throughout the public (e.g., the COVID-19 pandemic, and the like) it is desirable to minimize interaction between two people, as well as minimize contact with devices that may be touched by other users. A self-checkout point-of-sale (POS) device 102a-n (generally, 102) can help to reduce interactions between people; however, current self-checkout systems and processes include various user interactions that may require the user touching an input interface (e.g., display, keypad) of the self-checkout POS device 102. Accordingly, implementation of aspects of the present disclosure may reduce or eliminate user interactions that may require the user touching the input interface of the self-checkout POS device 102. Non-limiting examples of user interactions that may require the user touching the input interface self-checkout POS device 102 that may be reduced or eliminated by the remote self-checkout system 100 and method(s) described herein include interactions associated with weighing an item (e.g., a produce item, coffee beans, candy, nuts), a pharmacy purchase, a gift card purchase, a gift card redemption, an age-restricted purchase (e.g., alcohol, tobacco, fireworks, solvents), a coupon redemption, a request for help from an administrative user, entering a passcode, entering an identification number, a payment process, and selection of a desired receipt format. In some examples, a user interaction may involve multiple interactions. According to one example, a first user interaction may include scanning an item, and a second user interaction may include providing additional information in relation to the item. A second user interaction that may be required as part of the self-checkout process may include or more of the above example user interactions. One example second interaction may be a user input of a selection of a produce item type, such that a weight detected by a scale 210 at the self-checkout POS device 102 can be associated with a price of the produce item type for determining a price of the item in the guest user's cart. Another example second interaction may be a user input of the guest user's age or a user input of an image of the guest user's ID, such that the guest user may be authorized to purchase an age-restricted item. For example, the second interaction may be performed by the guest user or by an administrative user. As should be appreciated, other user interactions are possible and are within the scope of the present disclosure.

In the example remote self-checkout system 100, one or more computing systems may communicate over a network or a combination of networks. Non-limiting examples of networks can include the Internet, an intranet, an extranet, a local-area network, a wide-area network, an edge network, wired networks, wireless networks, and combinations thereof. For example, the networked remote self-checkout system 100 may include at least one self-checkout POS device 102 communicatively connected to a self-checkout backend engine 106 and a remote self-checkout engine 108. Additionally, the remote self-checkout system 100 may include a remote self-checkout orchestrator 112 communicatively connected to a user mobile computing device 110 and the remote self-checkout engine 108.

In general, initiation of a self-checkout session at a self-checkout point POS device 102 may cause a unique coded image 114 to be displayed at the self-checkout point POS device 102, which may be scanned by the user mobile computing device 110 (e.g., via a code reader application) and translated into a link to direct the user mobile computing device 110 to the remote self-checkout orchestrator 112. The unique coded image 114 may further include information about the self-checkout point POS device 102 at which the unique coded image 114 was displayed and captured and information about the self-checkout session, which may be communicated to and used by the remote self-checkout orchestrator 112 and the remote self-checkout engine 108 to link the user mobile computing device 110 with the self-checkout point POS device 102 and the self-checkout session. For example, linkage of the user mobile computing device 110 with the self-checkout point POS device 102 and the self-checkout session enables the user to perform one or more self-checkout session interactions on the user mobile computing device 110, rather than via the input interface (e.g., display, keypad) of the self-checkout POS device 102. In some examples and as will be described in further detail below, the unique coded image 114 may be scanned by both a guest user mobile computing device 110*a* and an administrative user mobile computing device 110*b*, thereby allowing the administrative user to access the self-checkout session from the administrative user's device 110*b* to perform administrative transactions (e.g., cancelling or modifying cart details, overriding a guest user interaction). Accordingly, aspects may provide such advantages as reducing or eliminating shared touchpoints between users (e.g., which can help reduce transmission of some highly communicable diseases) and increasing accessibility (e.g., for users who may have disabilities that can affect their interaction with the input interface of a self-checkout POS device 102). Other advantages are possible and are within the scope of the present disclosure.

The self-checkout POS devices 102, self-checkout backend engine 106, the remote self-checkout engine 108, the user mobile computing devices 110, and the remote self-checkout orchestrator 112 may be implemented using various types of computing devices that include at least one processor and a memory coupled to the at least one processor, the memory including instructions that when executed by the at least one processor operate to perform one or more operations associated with implementing remote self-checkout. Non-limiting examples of computing devices include servers, workstations, self-checkout POS devices 102, desktop computers, laptop computers, mobile phones 110, tablets, smart devices, gaming devices, wearable devices, databases, etc. Further details of the computing devices and variations thereof can be found in FIG. 10.

Figure 2:
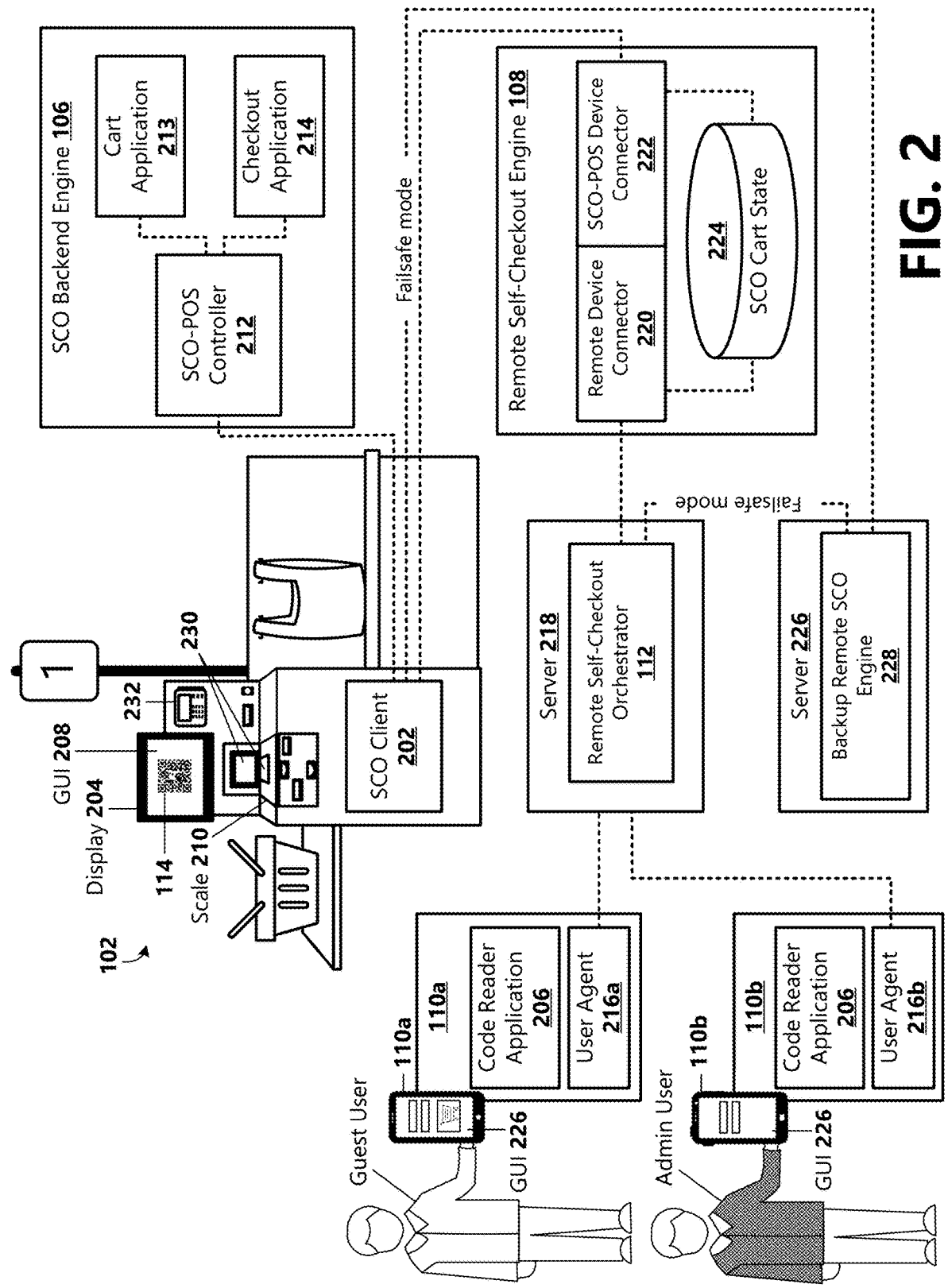
FIG. 2 is a diagram illustrating components of an example remote self-checkout system in an example implementation.

Further details of the self-checkout POS system 100 in accordance with one or more aspects of the present disclosure are described with reference to FIG. 2. In FIG. 2, the self-checkout POS device 102 includes a self-checkout POS client 202 (e.g., a computing device or other processing device) operative or configured to communicate with an enterprise location's self-checkout backend engine 106 and capable of performing and coordinating various functions of a retail self-checkout process. In general, the self-checkout backend engine 106 may be configured to provide one or more services or provide access to one or more services that are configured to perform one or more operations of a self-checkout process in a self-checkout session. One example service may include a shopping cart service that may be implemented by a cart application 213. For example, the cart application 213 may be operative or configured to perform various operations associated with linking information about items obtained from scanning the items during a self-checkout session and other information received in associated with the self-checkout session to a guest user cart instance. In some examples, items that the guest user may want to add to the cart instance (e.g., for purchase of those items) may be scanned using a scanner 230 included in or communicatively attached to the self-checkout POS device 102. In other examples, items that the guest user may want to add to the cart instance (e.g., for purchase of those items) may be scanned using an image sensor included in or communicatively connected to the user mobile computing device 110. In some examples, items that the guest user may want to add to the cart instance may require at least two transactions or user interactions. For example, confirmation or data entry may be associated with certain items (e.g., weighed goods (produce and the like), items that require user identification (ID) to be purchased (regulated items and the like), gift cards, pharmacy items). One or more transactions associated with adding such items to the guest user cart instance may be performed using an input interface of the self-checkout POS device 102, a guest user mobile computing device 110*a*, and/or on an administrative user mobile computing device 110*b* in a manner integrated with the self-checkout POS device 102 to avoid user contact with a touchpad or other input interface of the self-checkout POS device. Another example service that may be provided by the self-checkout backend engine 106 may include a checkout (e.g., payment) service that may be implemented by a checkout application 214. For example, the checkout application 214 may be operative or configured to perform various operations associated with receiving payment for an amount owed by the guest user in exchange for items included in the guest user cart instance. Other services are possible and are within the scope of the present disclosure.

According to an example aspect, the self-checkout POS client 202 is operative or configured to generate a unique coded image 114 and present the unique coded image 114 for display on a display 204 included at the self-checkout POS device 102. In one example implementation, the unique coded image 114 is a QR code. As mentioned above, the unique coded image 114 may be scanned by a code reader application 206 on a guest user's or an administrative user's mobile computing device 110. For example, an image sensor included in the user mobile computing device 110 may capture the unique coded image 114, which may include embedded information that can be read by the code reader application 206. In some examples, the self-checkout POS client 202 may be operative or configured to continually generate an updated unique coded image 114 for presentation on the display 204. For example, each generated unique coded image 114 may be valid for a predetermined time period or until the unique coded image 114 is captured by a user mobile computing device 110 and used to link the user mobile computing device 110 to the self-checkout POS device 102. Generating updated unique coded images 114 may provide a benefit of increased security.

According to an aspect, information embedded in a unique coded image 114 may include a link that may be used to direct the user mobile computing device 110 to the remote self-checkout orchestrator 112. The embedded information may further include information about the self-checkout point POS device 102 at which the unique coded image 114 was displayed and captured and information about a self-checkout session during which the unique coded image 114 was displayed and captured, which may be provided to the remote self-checkout orchestrator 112 in response to using the link to create a bridge between the user mobile computing device 110 and the self-checkout POS device 102. For example, the bridge may allow the user (e.g., guest user, administrative user) to perform self-checkout interactions on the user mobile computing device 110, rather than via an input interface of the self-checkout POS device 102.

According to an aspect, for a self-checkout session, the remote self-checkout orchestrator 112 may allow only one connection between a guest user mobile device 110a and the remote self-checkout engine 108, which may provide a benefit of increased security. According to an aspect, in addition to the one connection allowed between the guest user mobile device 110a and the remote self-checkout engine 108, another connection may be allowed for the self-checkout session if the connection is between an administrative user mobile device 110b and the remote self-checkout engine 108. For example, the unique coded image 114 captured by the guest user mobile computing device 110a may also be captured by an administrative user mobile computing device 110b for connecting to the same self-checkout POS device 102 and associated self-checkout session. The administrative user may use the administrative connection to perform a user interaction associated with the self-checkout session using his/her mobile computing device 110b, which may include performing an administrative transaction, such as cancelling or modifying item or order details, overriding a guest user interaction, verifying the guest user's identity and/or age, etc.

One example input interface of the self-checkout POS device 102 includes the display 204. For example, the display 204 may be a touchscreen display that may be operative or configured to display a graphical user interface (GUI 208) that may be used to display data, including the unique coded image 114 and other self-checkout session information, and to provide various selectable controls for receiving user input associated with the self-checkout session. Other user inputs associated with the self-checkout session may be received via the GUI 208 and/or user interactions with one or more other input interfaces included in the self-checkout POS device 102. For example, user inputs received in association with the various selectable controls presented by the GUI 208 or via another input interface (e.g., a scale 210, a payment kiosk 232, a keypad, a scanner 230) may be received by the self-checkout POS client 202 and passed to the self-checkout backend engine 106 for performing one or more self-checkout session processes.

According to an example implementation, a self-checkout session may include various user-related interactions. Some of the various user-related interactions may be associated with: adding items to be purchased to the guest user's self-checkout cart (instance) or modifying items in the cart (instance), such as deleting an item from the cart (instance), modifying a quantity or price of an item, and/or providing additional information in relation to an item (e.g., information in conjunction with using a scale 210 provided by the self-checkout POS device 102, date-of-birth information, personal identification information, an amount for a gift card); selecting a payment option; purchasing/providing payment for items in the cart (instance); other options presented in the GUI 208 (e.g., entry of a membership identification number, a selection of whether the guest user brought their own bags, a selection of whether and/or how the guest user would like to receive a receipt or gift receipt associated with the self-checkout session, a selection of whether the guest user would like to redeem a coupon, a selection of whether the guest user would like to request help from an administrative user, entry of a passcode or PIN); etc. In some examples, the self-checkout backend engine 106 may include a self-checkout POS controller 212 that may be in communication with the cart application 213 and the checkout application 216. For example, communications received from the self-checkout POS device 102 may be received by the self-checkout POS controller 212 and directed to the cart application 213 for handling cart-related tasks or to the checkout application 214 for handling checkout/payment-related tasks.

As described above, information embedded in a unique coded image 114 may include a link that may be used to direct the user mobile computing device 110 to the remote self-checkout orchestrator 112. For example, the user mobile computing device 110 may further include a user agent 216a and 216b (generally, 216) operative or configured to communicate over a network with a server 218. According to an example implementation, the user agent 116 may include a web browser application or a client web application (e.g., hosted by the enterprise). The server 218 may be located at the enterprise headquarters, in a cloud computing network, an edge computing network, or other location. In some examples, such as when the user agent 116 is implemented as a client web application, a user credential (e.g., a passcode, a biometric credential, a two-factor input) may be requested from the user, which may be provided by the user, received by the user mobile computing device 110, and communicated to an authentication engine for authenticating the user's identity for allowing the user to access a guest user account. In some examples, a user agent 216b operating on an administrative user mobile computing device 110b may require an enterprise user credential for allowing the administrative user to access the user agent 216 for performing administrative transactions related to a self-checkout session. In such instances, administrative transactions may include additional transactions not available to the guest user account, such as canceling or modifying an order, adjusting a price, or performing other override options. Accordingly, in such instances, a user interface of user agent 216*b* may include additional graphical options not presented on the user agent 216*a* (and seen below) to effect such changes.

In some examples, the guest user account may include payment information (e.g., credit card information) and other information about the guest user that may be used to facilitate the self-checkout session. In some examples, the guest user account may include a link to a cart instance initiated at a computing device other than the self-checkout POS device 102, such as an online shopping cart instance or an in-store user mobile computing device-assisted cart instance. In some examples, a cart instance initiated at a computing device other than the self-checkout POS device 102, such as at the guest user mobile computing device 110*a*, may be linked with a self-checkout POS device 102 responsive to the guest user using the guest user mobile computing device 110*a* to scan a unique coded image 114 displayed on a display 204 of the self-checkout POS device 102.

According to an aspect, the remote self-checkout orchestrator 112 may be operative or configured to receive a request, from a user agent 216 operating on a user mobile computing device 110, to create a connection/link (hereafter referred to as a bridge) between the user mobile computing device 110 and the self-checkout POS device 102 and the associated self-checkout session. In response to the request, the remote self-checkout orchestrator 112 may be further operative or configured to communicate with the remote self-checkout engine 108.

In an example aspect, the remote self-checkout engine 108 may include a remote device connector 220 and a self-checkout POS device connector 222. The remote device connector 220 and the self-checkout POS device connector 222 may be operative or configured to receive information associated with the self-checkout session, including information associated with the current state of the guest user's cart instance. For example, the self-checkout POS client 202 may be operative or configured to communicate updates associated with the self-checkout session (e.g., including user interactions initiated at the self-checkout POS device 102) to the self-checkout POS device connector 222. Moreover, the user agent 216 operating on the user mobile computing device 110 may be operative or configured to communicate user interactions associated with the self-checkout session (e.g., initiated at the user mobile computing device 110) to the remote device connector 220 for synchronizing with the guest user's self-checkout cart instance. The information associated with the current state of the guest user's cart instance may be stored in data storage 224 included in or communicatively connected to the remote self-checkout engine 108. In some examples, the information associated with the current state of the guest user's cart instance may include an identifier associated with the self-checkout POS device 102 and an identifier associated with the self-checkout session. For example, information associated with the self-checkout session may be used by the self-checkout POS device connector 222 to transmit information about interactions made at the user mobile computing device 110 in association with the (remote) self-checkout session to the self-checkout client 202 for processing as part of the self-checkout process.

For example, the bridge created by the remote self-checkout orchestrator 112 may allow for information associated with the self-checkout session provided by the self-checkout client 202 to be passed to the user mobile computing device 110. The bridge may further allow for user interactions (and other inputs) received at the user mobile computing device 110 in association with the self-checkout session to be passed to the self-checkout POS client 202. In some examples, communications between the remote self-checkout orchestrator 112 and the remote device connector 220 may include REpresentational State Transfer (REST) requests and responses. Implementation of the bridge may reduce or eliminate touch interaction by one or more user(s) (e.g., a guest user and/or an administrative user) at the self-checkout POS device 102 by allowing user interactions associated with the self-checkout session to be performed by the user(s) at the user mobile computing device(s) 110. According to an aspect, the user agent 216 may be operative or configured to provide a GUI 226 that may be displayed on a screen of the user mobile computing device 110. For example, the user agent 216 may use the GUI 226 to display data, including self-checkout session-related information, and to provide various selectable controls for receiving user interactions associated with the self-checkout session. For example, user interactions received in association with the various selectable controls presented by the GUI 226 or via another input interface may be received and directed by the user agent 216 operating on the user mobile computing device 110 to the remote self-checkout orchestrator 112. In some examples, information associated with the self-checkout session may be presented to the user via an accessible input interface usable by users who may have a disability. In some examples, user interactions may be received via an accessible input interface usable by users who may have a disability. Accordingly, aspects of the present disclosure may allow the self-checkout POS device 102 to be accessible to more users, including users who may have a disability. The accessible input interface may be included in or communicatively connected to the user mobile computing device 110.

In some examples, the remote self-checkout system 100 may include a backup remote self-checkout engine 228 as a failsafe. For example, the backup remote self-checkout engine 228 may be configured to operate on a server 226 and may be operative to, if/when a failure occurs, perform the operations performed by the remote self-checkout engine 108 (e.g., including the remote device connector 220, the self-checkout POS device connector 222, and the self-checkout cart state data storage 224). For example, in case of a failure, communications associated with the self-checkout session originating from the user mobile computing device 110 and received by the remote self-checkout orchestrator 112 may be directed to the backup remote self-checkout engine 228. Additionally, in case of a failure, communications associated with the self-checkout session originating from the self-checkout POS client 202 may be directed to the backup remote self-checkout engine 228. The server 226 may be located at the enterprise headquarters, in a cloud computing network, an edge computing network, or other location.

In some examples, the remote self-checkout orchestrator 112 may be further operative or configured to disconnect a remote self-checkout session connecting the user mobile computing device 110 and the remote self-checkout engine 108 or the backup remote self-checkout engine 228, such as during inactivity and at the end of the self-checkout session. In some examples, the remote self-checkout orchestrator 112 may be further operative or configured to allow only one remote self-checkout session per self-checkout session.

Figure 3:
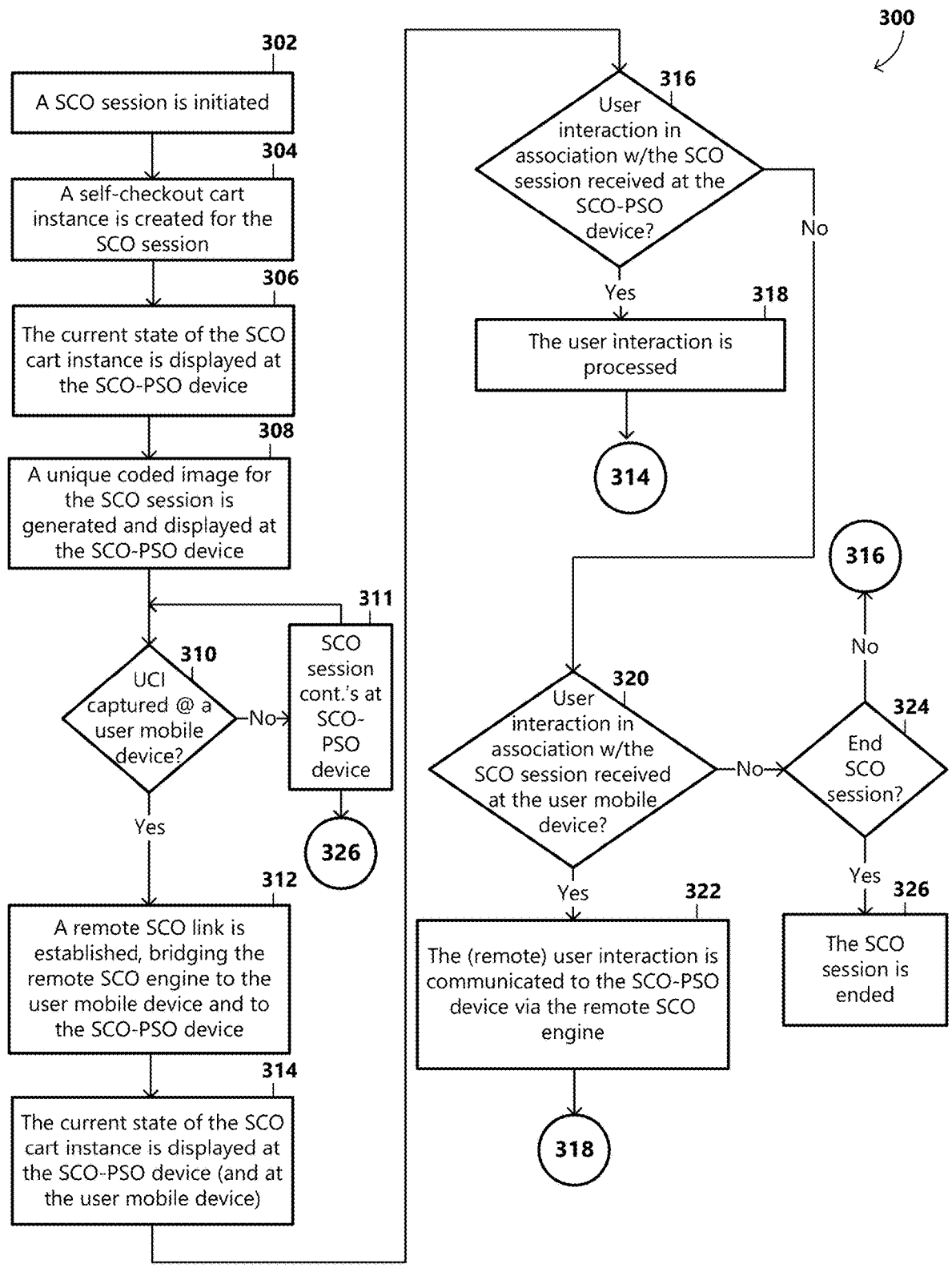
FIG. 3 is a flow chart depicting general stages of an example process or method for providing remote self-checkout in an example implementation.

FIG. 3 is a flow chart depicting general stages of an example process or method 300 for providing remote self-checkout according to an embodiment. At OPERATION 302, a self-checkout session may be initiated. In some examples, the self-checkout session may be initiated responsive to a user interaction with a self-checkout POS device 102. Some example user interactions may include a scan of an item to be purchased by a guest user, a scan of an enterprise-associated membership code linked to the guest user's enterprise account, or a detection of a guest user at the self-checkout POS device 102.

At OPERATION 304, the self-checkout cart instance may be created for the guest user. For example, responsive to receiving an indication that the self-checkout session has been initiated, the self-checkout client 202 may communicate with the self-checkout backend engine 106 for requesting a new cart instance in association with the self-checkout session at the self-checkout POS device 102. The new cart instance in association with the self-checkout session at the self-checkout POS device 102 may be created and communicated to the self-checkout POS device 102.

At OPERATION 306, the GUI 208 displayed at the self-checkout POS device 102 may be updated to show the current state of the guest user's self-checkout cart instance.

At OPERATION 308, a unique coded image 114, such as a QR code, may be generated by the self-checkout client 202 and displayed on the display 204 included at the self-checkout POS device 102. In some examples, the unique coded image 114 may expire after a time period, and if the expiry time period is reached, a new unique coded image 114 may for generated and displayed on the display 204 of the self-checkout POS device 102.

At DECISION OPERATION 310, a determination may be made as to whether the unique coded image 114 has been captured by a user mobile computing device 110 (e.g., a guest user device or an administrative user device) for establishing a remote self-checkout link between the user mobile computing device 110. For example, when the unique coded image 114 has been captured by the mobile computing device 110, information embedded in the unique coded image 114 may instruct the mobile computing device 110 to communicate with the remote self-checkout orchestrator 112, and at OPERATION 312, a remote self-checkout bridge may be established based on additional information (e.g., information about the self-checkout device 102 and the self-checkout session) embedded in the unique coded image 114. For example, the remote self-checkout bridge may include a first communications link established between the user mobile computing device 110 and the remote self-checkout orchestrator 112, a second communications link established between the remote self-checkout orchestrator 112 and the remote self-checkout engine 108, and a third communications link established between the remote self-checkout engine 108 and the self-checkout POS device 102.

If, at DECISION OPERATION 310, the unique coded image 114 has not been captured by a mobile computing device 110, the self-checkout session may continue at the self-checkout POS device 102 at OPERATION 311. For example, the self-checkout session may continue at the self-checkout device 102 until a determination is made that the unique coded image 114 has been captured by a mobile computing device 110 at DECISION OPERATION 310 or until the self-checkout session is ended (e.g., completion of checkout/purchase of items in the self-checkout cart instance) at OPERATION 326. At OPERATION 314, current state information associated with the self-checkout cart instance may be obtained from the self-checkout POS device 102 and passed to the remote self-checkout engine 108, where the information may be received by the self-checkout POS device connector 222 and stored in data storage 224. Additionally, the remote device connector 220 may obtain the current state information associated with the self-checkout cart instance and transmit the information to the remote self-checkout orchestrator 112 for further communication to the user mobile computing device 110. Further, the self-checkout PSO device 102 and the user mobile computing device 110 may provide GUI 208 and GUI 226, respectively, via which the self-checkout PSO device 102 and the user mobile computing device 110 may display a representation of the current state of the guest user's self-checkout cart instance. In some examples, based on the current state of the self-checkout cart instance, the GUI 208,226 may include various selectable controls for allowing the user to provide a user interaction associated with the self-checkout session.

At DECISION OPERATION 316, a determination may be made as to whether a user interaction associated with the self-checkout session is received at the self-checkout POS device 102. When a user interaction associated with the self-checkout session is received, at OPERATION 318, the user interaction may be processed. One example user interaction associated with the self-checkout session that may be received at the self-checkout POS device 102 may include the user scanning an item for purchase. Accordingly, at OPERATION 318, information obtained in association with the user interaction (e.g., information obtained by the scanner 230) and information about a self-checkout session operation to perform with the information may be communicated by the self-checkout client 202 to the self-checkout POS controller 212, where the information may then be passed to the appropriate service (e.g., the cart application 213) to perform the self-checkout session operation. For example, the cart application 213 may add information describing the item to the self-checkout cart instance. Additionally, based on the self-checkout session operation performed by service, the self-checkout POS controller 212 may provide information about the current state of the self-checkout cart instance to the self-checkout client 202.

The method 300 may then return to OPERATION 314, where the current state of the self-checkout cart instance may be updated at the remote self-checkout engine 108 and further communicated to the user mobile computing device 110 via the remote self-checkout orchestrator 112. For example, the GUI 208 displayed at the self-checkout POS device 102 and the GUI 226 displayed on the user mobile computing device 110 may be updated to display a synchronized representation of the current state of the self-checkout cart instance.

If a user interaction associated with the self-checkout session is not received at the self-checkout POS device 102 at DECISION OPERATION 316, at DECISION OPERATION 320, a determination may be made as to whether a user interaction associated with the self-checkout session is received at the user mobile computing device 110. When a user interaction associated with the self-checkout session is received at the user mobile computing device 110, at OPERATION 322, the (remote) user interaction may be communicated to the self-checkout client 202 via the remote self-checkout bridge.

The method 300 may then return to OPERATION 318, where the user interaction may be processed. According to one example, a first user interaction associated with the self-checkout session may include the user scanning an item for purchase at the self-checkout POS device 102 or using the user mobile computing device 110, and in processing the first user interaction, the current state of the self-checkout cart instance may include information associated with requiring a second user interaction to complete a process included in the self-checkout session. For example, the item for purchase may be a gift card purchase, which may require a user interaction of a user input of a value amount for the gift card.

If a user interaction associated with the self-checkout session is not received at the user mobile computing device 110 at DECISION OPERATION 320, at DECISION OPERATION 324, a determination may be made as to whether to end the self-checkout session. In some examples, completion of checkout/purchase of items in the self-checkout cart instance may signal the end of the self-checkout session. If, for example, the checkout/purchase of items in the self-checkout cart instance has not been completed via a user interaction at the self-checkout POS device 102 or the user mobile computing device 110, the method 300 may return to OPERATION 316. Otherwise, if the checkout/purchase of items in the self-checkout cart instance has been completed via a user interaction at the self-checkout POS device 102 or the user mobile computing device 110, the self-checkout session may be terminated at OPERATION 326. For example, upon completion of scanning of items, either using the self-checkout POS device 102 or user mobile computing device 110, the guest user 110 may select to pay for the items using one option displayed in both the GUI 208 displayed at the self-checkout POS device 102 and the GUI 226 displayed on the user mobile computing device 110. Accordingly, a user may select the extent to which that particular user wishes to touch the display 204 or other input interfaces of the self-checkout POS device 102. Additionally, for users who do not have a user mobile computing device 110 with them, or do not have an appropriate mobile application installed, such users may use the self-checkout POS device 102 to complete the self-checkout session.

Figure 4:
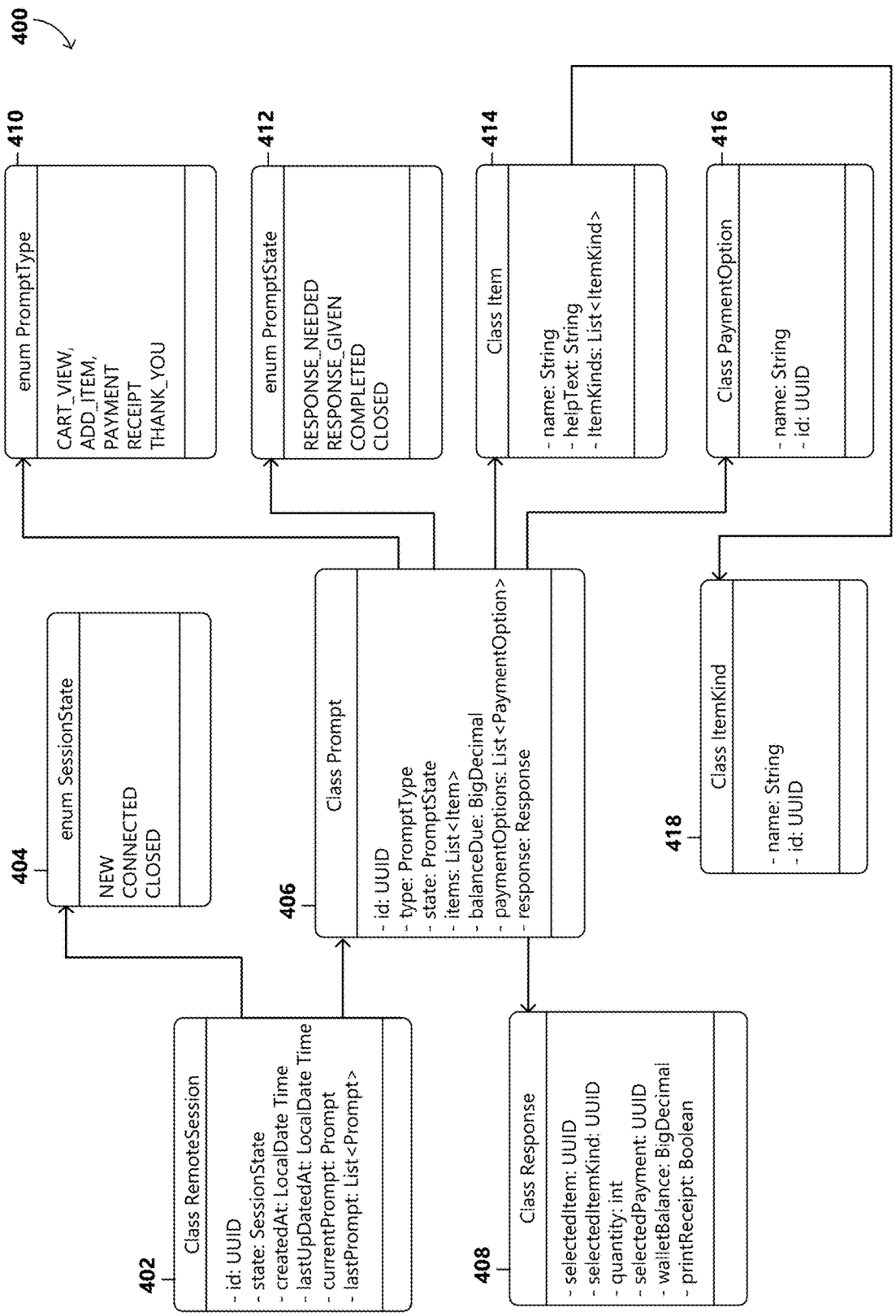
FIG. 4 is an illustration of an example data structure that may be used for providing remote self-checkout in an example implementation.

FIG. 4 illustrates an example data structure 400 that may be managed by one or more components of the remote self-checkout system 100 to provide one or more aspects of remote self-checkout, in an example implementation. The example data structure 400 shown includes a remote session table 402, linked to a session state table 404 that manages a state of the sessions defined in the remote session table. Additionally, a class prompt table 406 may be linked to the remote session table 402, and in turn links to a class response table 408, a prompt type table 410, a prompt state table 412, a class item table 414, and a class payment option table 416. A class item kind table 418 may link to the class item table 414 to define a type of item identified by a particular identifier.

Figure 5:
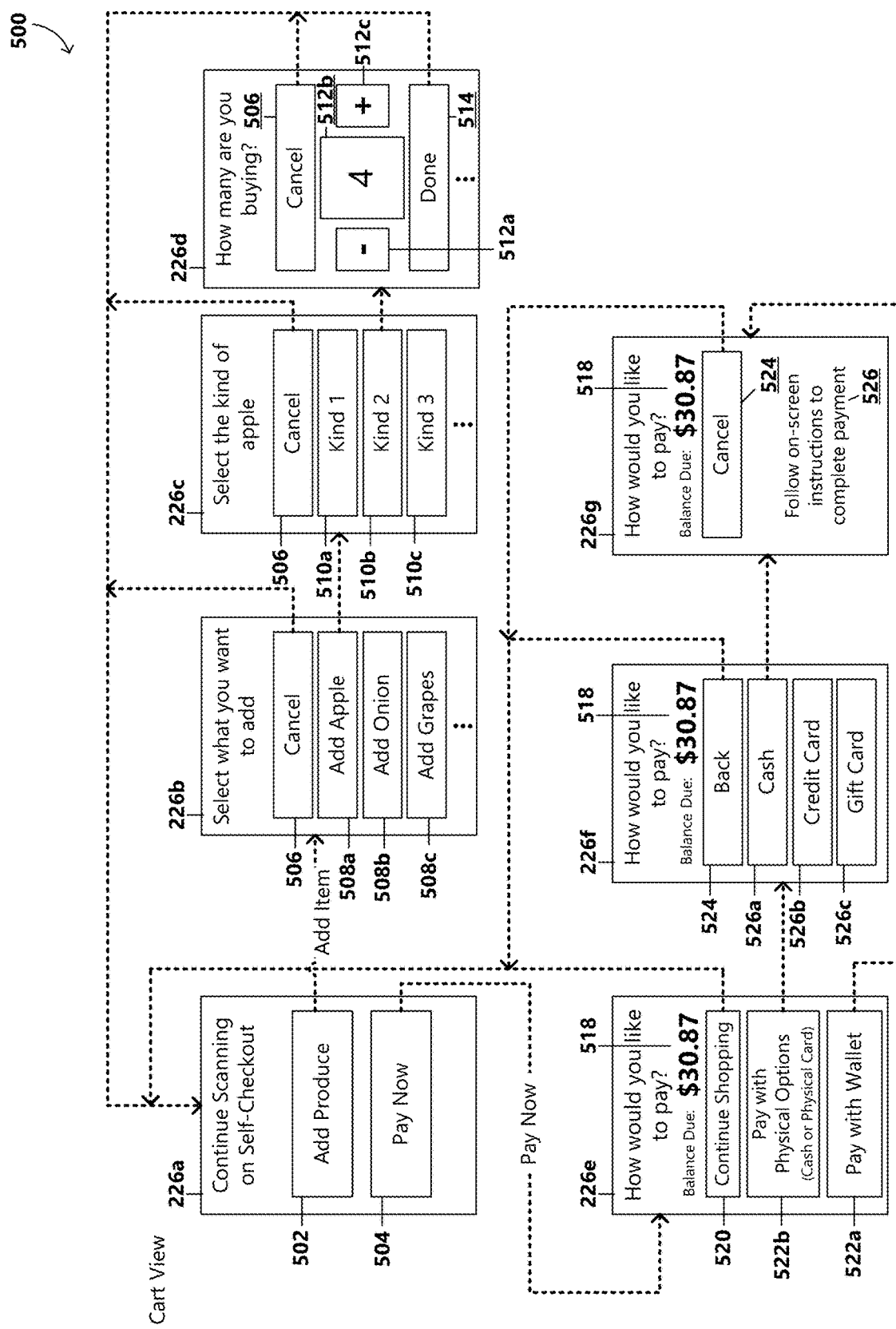
FIG. 5 illustrates an example flow through user interfaces of a user mobile computing device as part of a remote self-checkout session in an example implementation.

FIG. 5 illustrates an example flow 500 through GUIs 226a-226g that may be displayed on a user mobile computing device 110 during a remote self-checkout session for receiving user interactions associated with the remote self-checkout session and for providing information to the user. As should be appreciated, the example GUIs 226 and controls that are shown are for illustrative purposes and are not liming of the various GUIs and that may be displayed and the various controls that may be provided for receiving user interactions. Additional and/or alternative GUIs 226 and controls are possible and are within the scope of the present disclosure. In the example illustration, a first example GUI 226a includes an initial cart view in which a user may either add items to a guest user's self-checkout cart instance associated with the remote self-checkout session or perform payment for items in the cart instance. For example, the first example GUI 226a may include a first control for adding an item to the cart instance, herein referred to as an 'add item' control 502, and a second control for checking out or paying a balance for items in the cart instance, herein referred to as a 'pay now' control 504. In some examples, the user may add an item to the cart instance by scanning a code affixed to the item or by selecting the add item control 502. In some examples, the 'add item' control 502 may be associated with adding an item of a plurality of item types or may be associated with added an item of a specific type. For example and as illustrated, the 'add item' control 502 may allow the user to initiate an operation to add a produce item to the cart instance. Other types of items are possible and are within the scope of the present disclosure. In some examples, selection of the 'add item' control 502 may cause the self-checkout POS client 202 to present a next GUI 226, such as the second example GUI 226b.

In the example illustration, the second example GUI 226b may prompt the user to select an item type. For example, based on the item, the user interaction associated with selecting to add an item to the cart instance may require at least a second user interaction to complete the operation of adding the item to the cart instance. The second example GUI 226b may include a first control for cancelling the operation, herein referred to as a 'cancel' control 506, and a plurality of controls for selecting the item type, herein referred to as 'item type' controls 508a, 508b, 508c (generally 508). Other item types and other 'item type' controls 508 are possible and are within the scope of the present disclosure. In some examples, selection of an 'item type' control 508 may cause the self-checkout POS client 202 to present a next GUI 226, such as the third example GUI 226c.

In the example illustration, the third example GUI 226c may prompt the user to select an item sub-type. For example, based on the selected item type, the user interaction associated with selecting the item type may require at least a third user interaction to complete the operation of adding the item to the cart instance. The third example GUI 226c may include the 'cancel' control 506 and a plurality of controls for selecting the item sub-type, herein referred to as 'item sub-type' controls 510a, 510b, 510c (generally 510). Other item sub-types and other 'item sub-type' controls 510 are possible and are within the scope of the present disclosure. In some examples, selection of an 'item sub-type' control 510 may cause the self-checkout POS client 202 to present a next GUI 226, such as the fourth example GUI 226d.

In the example illustration, the fourth example GUI 226d may prompt the user to provide quantity or weight information about the item(s). For example, based on the item, at least a fourth user interaction may be required to complete the operation of adding the item to the cart instance. The fourth example GUI 226d may include the 'cancel' control 506, one or more controls for inputting a quantity of the item(s) to add to the cart instance, herein referred to as 'quantity' controls 512a, 512b, 512c (generally 512), and a control for submitting the item quantity information to the cart application 213, herein referred to as a 'done' control 514. In some examples, the fourth example GUI 226d may prompt the user to use the scale 210 to weigh the item(s). In some examples, selection of the 'done' control 514 may cause the self-checkout POS client 202 to submit the item quantity or weight information to the cart application 213 for completing the operation of adding the item(s) to the cart instance. In other examples, more or fewer user interactions may be required to complete the operation. Upon completion, the GUI 226 may be updated to return to the initial cart view included in the first example GUI 226a.

According to an aspect, selection of the 'pay now' control 504 in the first example GUI 226a may cause the self-checkout POS client 202 to present a next GUI 226, such as the fifth example GUI 226e. In the example illustration, the fifth example GUI 226e may include a cart instance balance 518, a prompt regarding a method of payment, a control for returning to the initial cart view to continue shopping, herein referred to as a 'continue shopping' control 520, and one or more controls for selecting a method of payment, herein referred to as 'payment option' controls 522a and 522b (generally, 522). Based on the selected 'payment option' control 522, the self-checkout POS client 202 may present a next GUI 226, such as the sixth example GUI 226f or the seventh example GUI 226g. Other payment options and 'payment option' controls 522 are possible and are with the scope of the present disclosure.

In some examples, selection of a 'payment option' control 522b associated with a physical payment method (e.g., cash or physical card) may cause the self-checkout POS client 202 to present the sixth example GUI 226f, which may prompt the user to select a payment type. In the example illustration, the sixth example GUI 226f may include the cart instance balance 518, a prompt regarding a payment type, a control for returning to a previous GUI 226, herein referred to as a 'back' control 524, and one or more controls for selecting a payment type, herein referred to as 'payment type' controls 526a, 526b, 526c (generally, 526).

In some examples, selection of a 'payment type' control 526 may cause the self-checkout POS client 202 to present the seventh example GUI 226g, which may prompt the user to follow instructions to complete the checkout/payment operation. Additionally, selection of a 'payment option' control 522a associated with a touchless payment method displayed in the fifth example GUI 226e (e.g., a pre-stored wallet including payment information associated with one or more payment types, a selection to enter card information via the GUI 226 or another input interface on the user mobile computing device 110) may cause the self-checkout POS client 202 to present the seventh example GUI 226g. In the example illustration, the seventh example GUI 226g may include the cart instance balance 518, the 'back' control 524, and a prompt 526 instructing the user to follow instructions to complete the checkout/payment operation. In some examples, such as if a cash or physical card payment type is selected, the prompt 526 may instruct the user to use a payment kiosk 232 at the self-checkout POS device 102 to complete the checkout/payment operation. In some examples, the self-checkout POS client 202 may request a checkout (e.g., payment) service implemented by the checkout application 214 to perform one or more operations of the checkout/payment operation. In some examples and as described below with reference to FIG. 10, the user may be enabled to complete checkout/payment via the user mobile computing device 110.

Referring now to FIGS. 6-10, provided are an example sequence of GUIs 208 that may be displayed on a self-checkout POS device display 204 and GUIs 226 that may be displayed on a screen of a user mobile computing device 110 during a remote self-checkout session for receiving user interactions associated with the session and for providing information to the user. As should be appreciated, the example GUIs and controls are for illustrative purposes and are not liming of the various GUIs that may be displayed and the various controls that may be provided for receiving user interactions. Additional and/or alternative GUIs and controls 508 are possible and are within the scope of the present disclosure.

Figure 6:
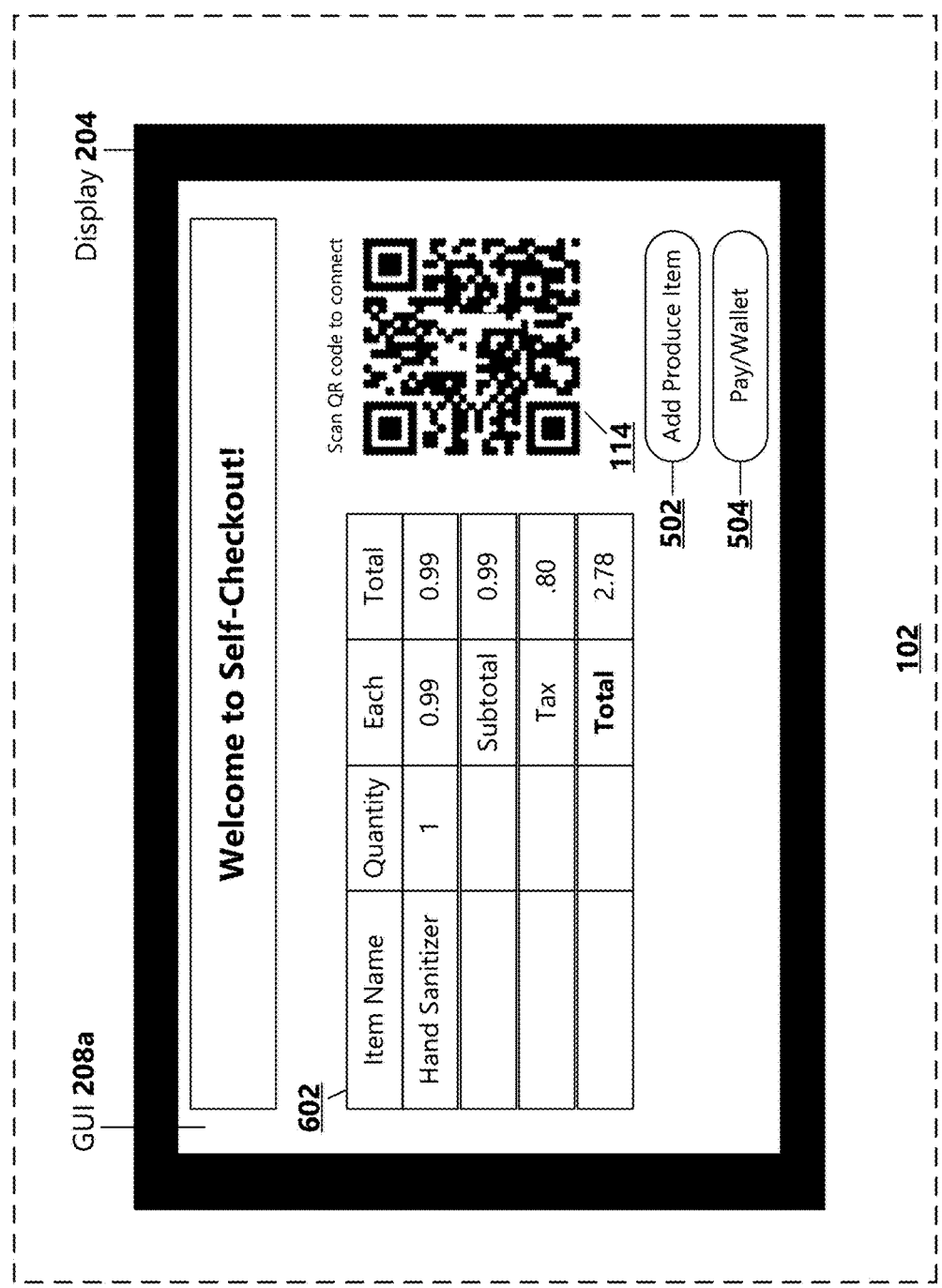
FIG. 6 illustrates an example user interface of a self-checkout point-of-sale device that implements one or more aspects of remote self-checkout described herein.

FIG. 6 illustrates an example self-checkout POS device GUI 208a that may implement one or more aspects of remote self-checkout described herein. In the example illustration, a user has scanned a code of an item, in this case hand sanitizer, at the self-checkout POS device 102. The example GUI 208a presented on the display 204 of the self-checkout POS device 102 may include a representation of the current state of the cart instance associated with the self-checkout session, herein referred to as a cart view 602. The example GUI 208a may further include a unique coded image 114, such as a QR code, which may be captured by a user mobile computing device 110 for bridging the user mobile computing device 110 with the self-checkout session. The example GUI 208a may further include a include an 'add item' control 502 for adding an item to the cart instance and 'pay now' control 504 for allowing the user to check out or pay a balance for items in the cart instance.

Figure 7:
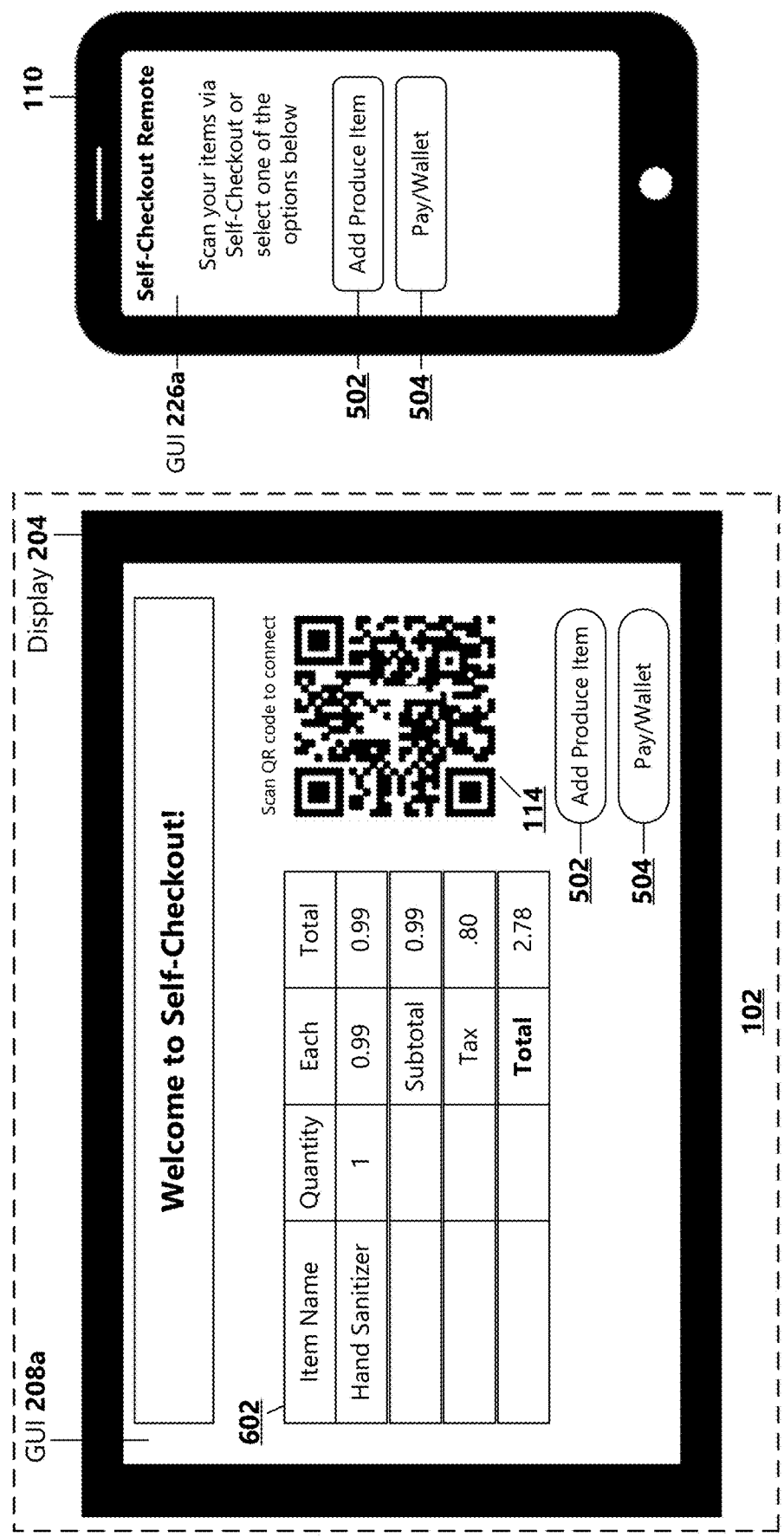
FIG. 7 illustrates a further example self-checkout point-of-sale device user interface and an example mobile device user interface that implements one or more aspects of remote self-checkout described herein.

FIG. 7 illustrates a further example of a self-checkout POS device GUI 208a and a mobile device GUI 226a that may implement one or more aspects of remote self-checkout described herein. In the example illustration, the user has scanned the unique coded image 114 presented on the display 204 of the self-checkout POS device 102. Accordingly, a GUI 226a may be presented on the user mobile computing device 110 that enables the user to also scan items using the user mobile computing device 110, either in addition to or as an alternative to the scanning functionality of the self-checkout POS device 102. Additionally, either the self-checkout POS device 102 or the user mobile computing device 110 may be used to pay for scanned items.

Figure 8:
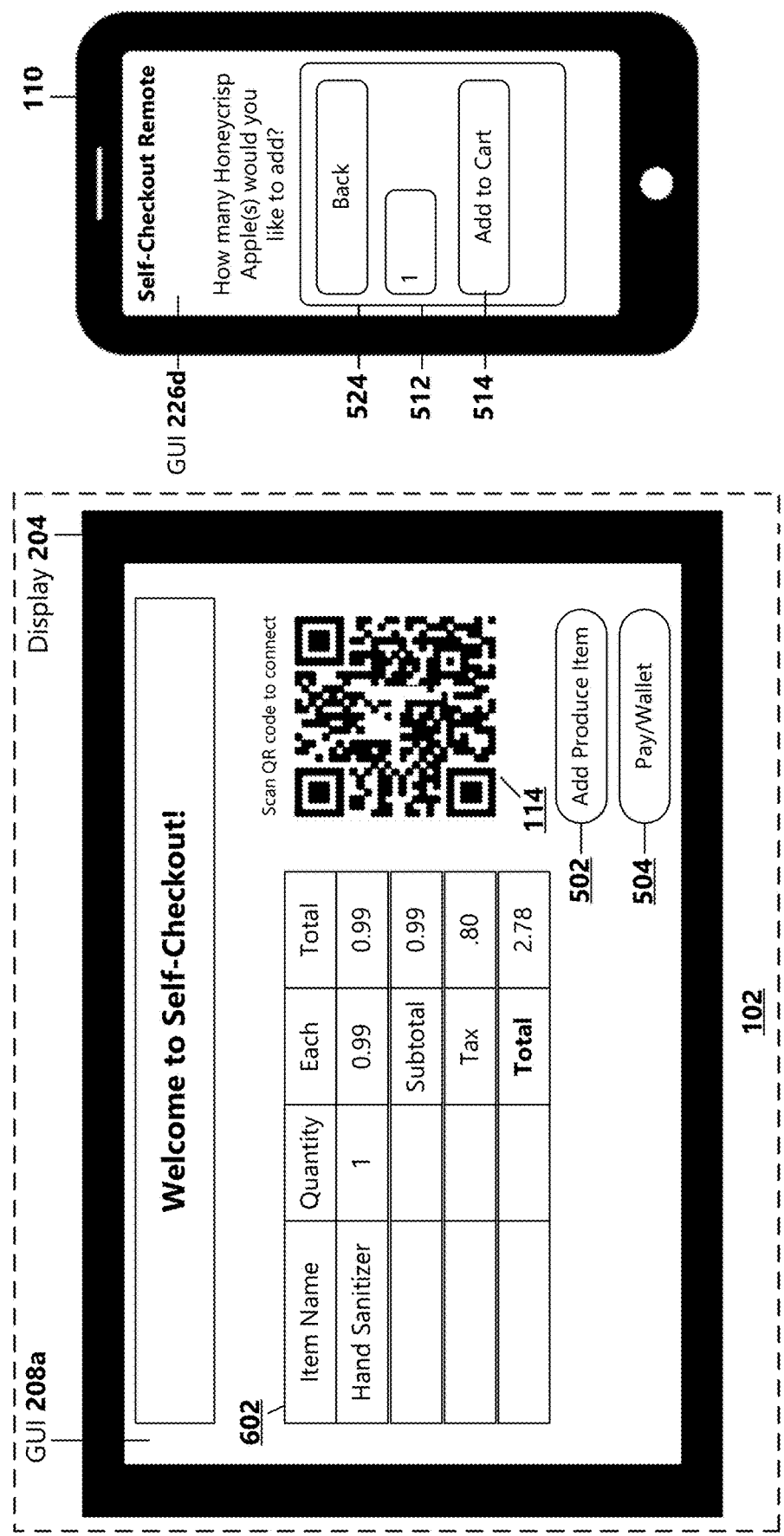
FIG. 8 illustrates a further example self-checkout point-of-sale device user interface and an example mobile device user interface that implements one or more aspects of remote self-checkout described herein.

FIG. 8 illustrates a further example of a self-checkout POS device GUI 208a and a mobile device GUI 226d that may implement one or more aspects of remote self-checkout described herein. In the example illustration, the user has scanned, at the user mobile computing device 110, a code for some apples. Via the example mobile device GUI 226d, the user may be prompted to manually enter a number of apples that are to be purchased using a 'quantity' control 512 and a 'done' control 514 to submit item quantity information to the cart application 213.

Figure 9:
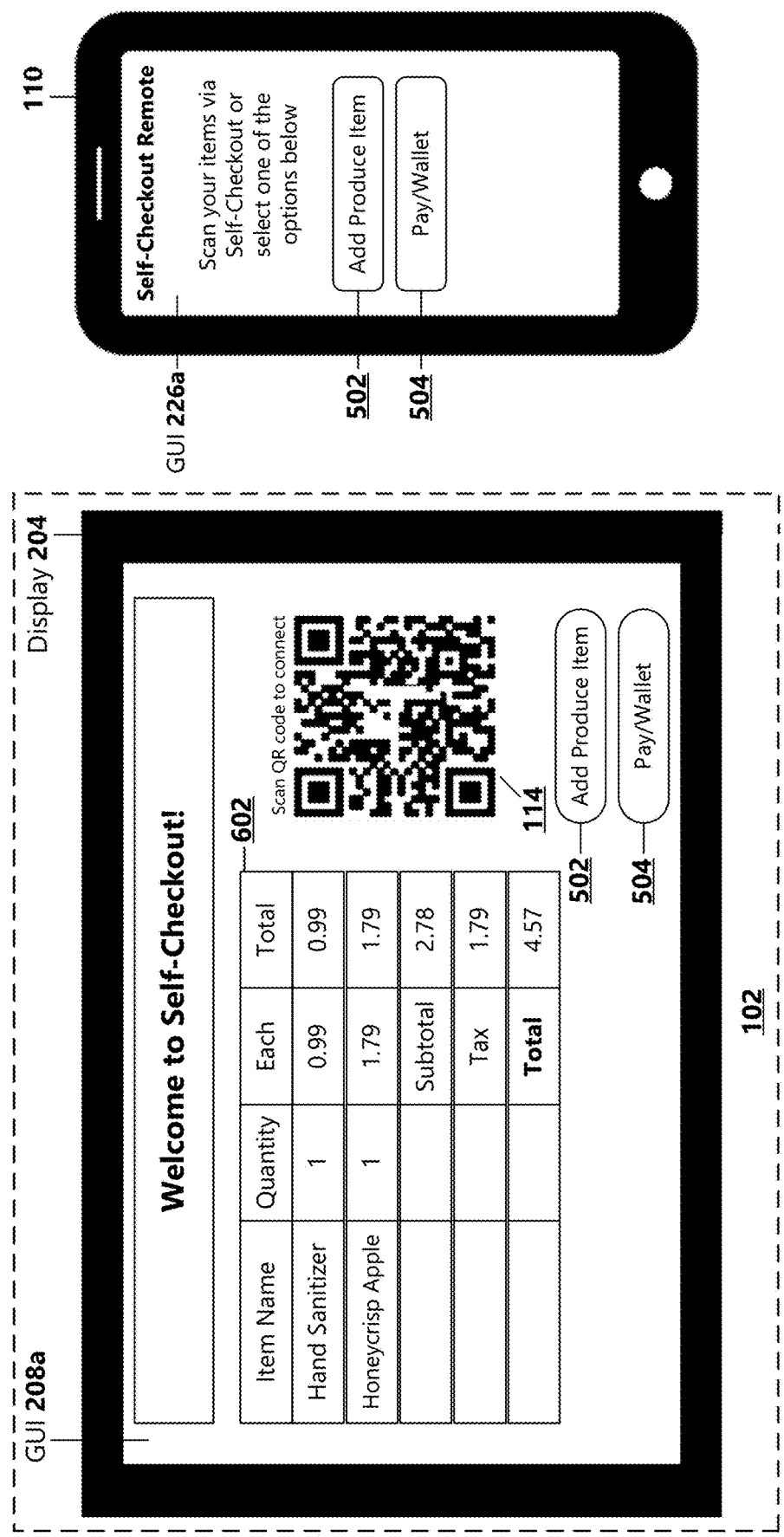
FIG. 9 illustrates a further example self-checkout point-of-sale device user interface and an example mobile device user interface that implements one or more aspects of remote self-checkout described herein.

FIG. 9 illustrates a further example of a self-checkout POS device GUI 208a and a mobile device GUI 226a that may implement one or more aspects of remote self-checkout described herein. In the example illustration, the user has scanned the code for and entered a number of apples to be purchased via the mobile device GUIs 226. Using the bridge implemented by aspects of the present disclosure that communicatively connect the user mobile computing device 110 and the self-checkout POS device 102 to the remote self-checkout engine 108, the self-checkout POS device GUI 208a may be updated to include the apples in the cart view 602 representing the current state of the cart instance associated with the self-checkout session. In some examples, the mobile device GUI 226 may be updated to include the apples in a cart view 602 representing the current state of the cart instance associated with the self-checkout session.

Figure 10:
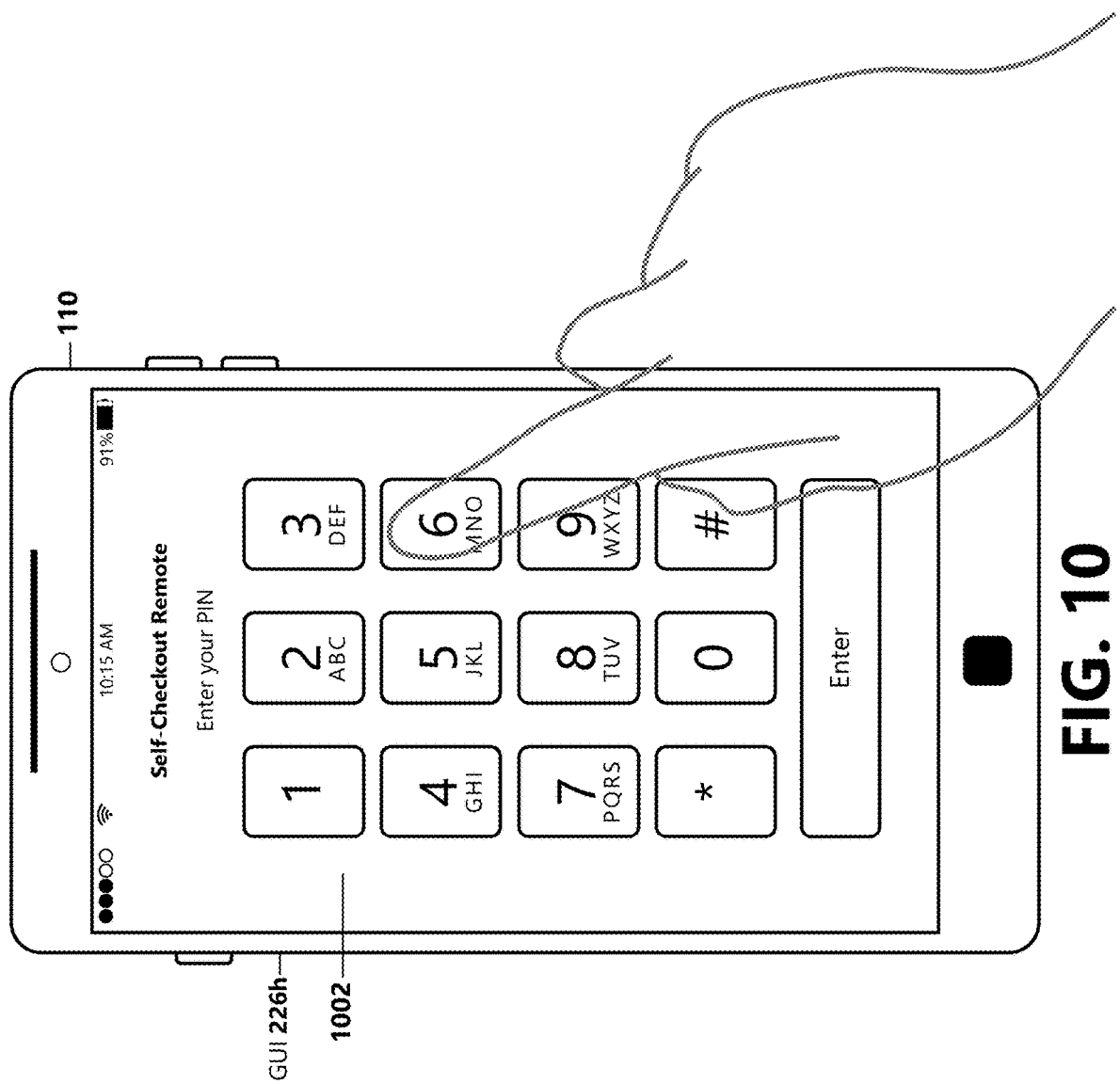
FIG. 10 illustrates an example mobile device user interface that implements one or more aspects of remote self-checkout described herein.

FIG. 10 illustrates an example mobile device GUI 226h that may implement one or more aspects of remote self-checkout described herein. In the example illustration, a number keypad 1002 is shown included in the example mobile device GUI 226h. For example, the user may be enabled to complete checkout/payment via the mobile device GUI 226h or another GUI provided on the user mobile computing device 110. Via the example mobile device GUI 226d, the user may be prompted to enter a PIN code that may be associated with a debit card used by the user to provide payment for purchased items. In other examples, other payment methods may be implemented by the user mobile computing device 110. As should be appreciated, the above example GUIs 208, 226 are for illustrative purposes and are not limiting of various other GUI configurations that may display data, including the unique coded image 114, a cart view 602, and other self-checkout session information, and to provide various selectable controls for receiving user interactions associated with the self-checkout session.

Generally, while the GUIs seen in FIGS. 7-10 provide specific examples of ways in which a mobile device may be used in place of a self-checkout kiosk, it is noted that these are exemplary, rather than limiting. For example, further user interfaces may be provided by which a user can select a manner of payment, or may select a number of bags used on a particular shopping trip.

Figure 11:
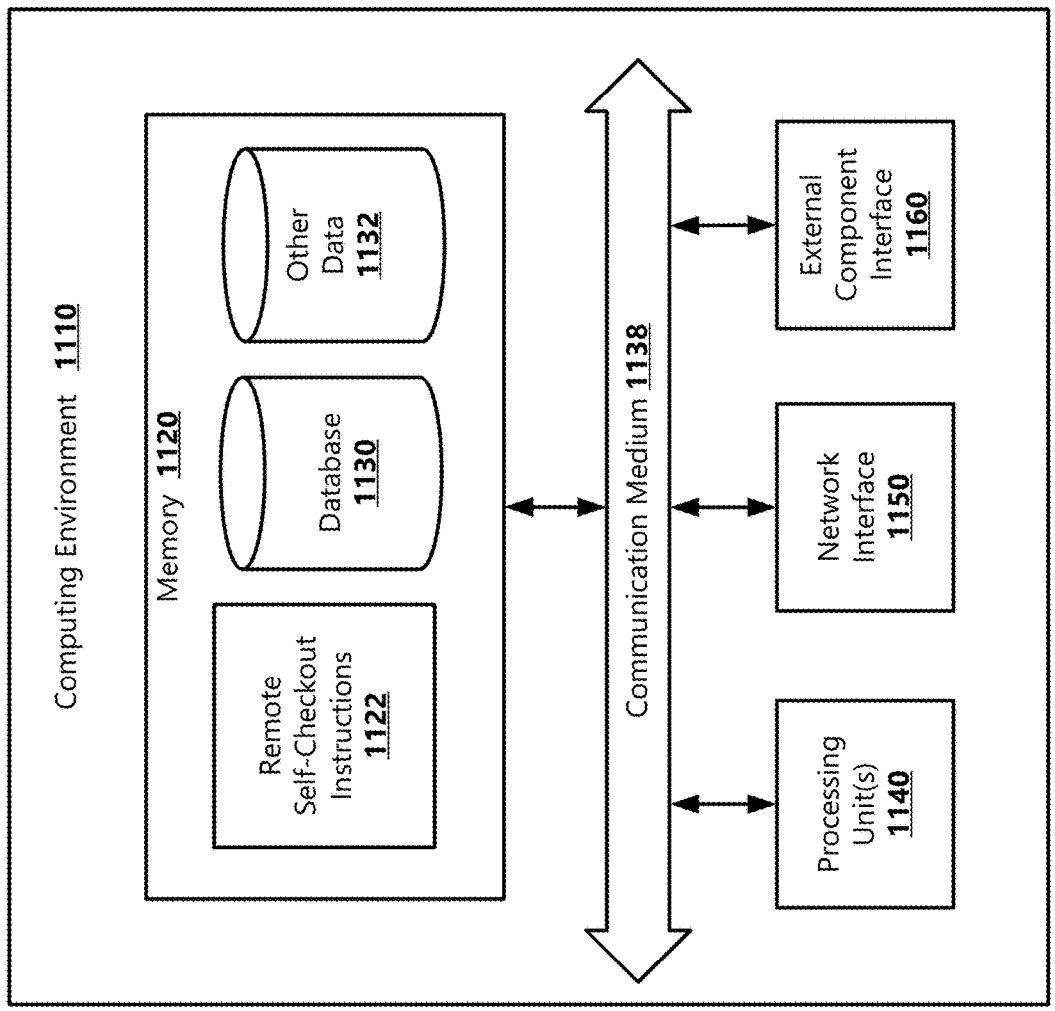
FIG. 11 illustrates an example computing system with which aspects of the present disclosure may be implemented.

FIG. 11 illustrates an example computing system 1100 with which aspects of the present disclosure may be implemented. In an example, a user mobile computing device 110, a self-checkout POS device 102, the remote self-checkout orchestrator 112, the remote self-checkout engine 108, the self-checkout backend engine 106, or other interacting computing devices can be implemented as one or more systems 1100 or one or more systems having one or more components of systems 1100. In an example, the system 1100 can include a computing environment 1110. The computing environment 1110 can be a physical computing environment, a virtualized computing environment, or a combination thereof. The computing environment 1110 can include memory 1120, a communication medium 1138, one or more processing units 1140, a network interface 1150, and an external component interface 1160.

The memory 1120 can include a computer readable storage medium. The computer storage medium can be a device or article of manufacture that stores data and/or computer-executable instructions. The memory 1120 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1120 can store various types of data and software. For example, as illustrated, the memory 1120 includes instructions 1122 for implementing one or more remote self-checkout processes described herein (e.g., as described in relation to FIGS. 1-10), database 1130 (e.g., data storage 224), as well as other data 1132. In some examples (e.g., where the computing environment 1110 is the remote self-checkout engine 108), the memory 1120 can include instructions for: receiving information associated with a current state of a guest user cart instance in association with a self-checkout session at a self-checkout POS device 102, storing the cart state information, and in response to receiving a request on behalf of a user mobile computing device 110 for the cart state information, providing the cart state information. In some examples, the memory 1120 included in the remote self-checkout engine 108 may further include instructions for: receiving information associated with a user interaction at the user mobile computing device 110 in association with the self-checkout session, storing the user interaction information, and passing the user interaction information to the self-checkout POS device 102 to be processed.

The communication medium 1138 can facilitate communication among the components of the computing environment 1110. In an example, the communication medium 1138 can facilitate communication among the memory 1120, the one or more processing units 1140, the network interface 1150, and the external component interface 1160. The communication medium 1138 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communication medium.

The one or more processing units 1140 can include physical or virtual units that selectively execute software instructions. In an example, the one or more processing units 1140 can be physical products comprising one or more integrated circuits. The one or more processing units 1140 can be implemented as one or more processing cores. In another example, one or more processing units 1140 are implemented as one or more separate microprocessors. In yet another example embodiment, the one or more processing units 1140 can include an application-specific integrated circuit (ASIC) that provides specific functionality. In yet another example, the one or more processing units 1140 provide specific functionality by using an ASIC and by executing computer-executable instructions.

The network interface 1150 enables the computing environment 1110 to send and receive data from a communication network. The network interface 1150 can be implemented as an Ethernet interface, a token-ring network interface, a fiber optic network interface, a wireless network interface (e.g., WI-FI), or another type of network interface.

The external component interface 1160 enables the computing environment 1110 to communicate with external devices. For example, the external component interface 1160 can be a USB interface, Thunderbolt interface, a Lightning interface, a serial port interface, a parallel port interface, a PS/2 interface, and/or another type of interface that enables the computing environment 1110 to communicate with external devices. In various embodiments, the external component interface 1160 enables the computing environment 1110 to communicate with various external components, such as external storage devices, input devices, speakers, modems, media player docks, other computing devices, scanners, digital cameras, and fingerprint readers.

Although illustrated as being components of a single computing environment 1110, the components of the computing environment 1110 can be spread across multiple computing environments 1110. For example, one or more of instructions or data stored on the memory 1120 may be stored partially or entirely in a separate computing environment 1110 that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

We claim:

1. A system for providing remote self-checkout, comprising:
    at least one processor; and
    a memory coupled to the at least one processor, the memory including instructions that when executed by the at least one processor cause the system to: receive an indication that a self-checkout session has been initiated at a self-checkout point-of-sale (POS) device;
    create a self-checkout cart instance associated with the self-checkout session;
    display, on a display of the self-checkout point-of-sale (POS) device, a user interface including a unique coded image associated with the self-checkout session at the self-checkout POS device, the unique coded image comprising information associated with the self-checkout POS device and an instruction for a guest user mobile computing device, wherein the unique coded image, when captured by the guest user mobile computing device, enables the guest user mobile computing device to request a connection with the self-checkout session at the self-checkout POS device according to the instruction;
    in response to receiving a first request for the connection, establish a first connection with the guest user mobile computing device and a second connection with the self-checkout POS device based on the information associated with the self-checkout POS device;
    receive, from the self-checkout POS device, information associated with a state of the self-checkout cart instance;
    provide the information associated with the state of the self-checkout cart instance to the guest user mobile computing device;
    receive, from the guest user mobile computing device, information associated with a user interaction in association with the self-checkout session;
    provide the information associated with the user interaction to the self-checkout POS device to be processed, wherein processing the information associated with the user interaction causes the state of the self-checkout cart instance to be updated;
    update the user interface displayed on the self-checkout POS device based on the updated state of the self-checkout user cart instance;
    in response to receiving a second request for a connection with the self-checkout session at the self-checkout POS device and in response to determining that the second request is from an administrative user mobile computing device, establish a third connection with the administrative user mobile computing device based on information comprised in the unique coded image, wherein the unique coded image, when captured by the administrative user mobile computing device, enables the administrative user mobile computing device to request a connection with the self-checkout session at the self-checkout POS device;
    provide information associated with the state of the self-checkout cart instance to the administrative user mobile computing device;
    receive, from the administrative user mobile computing device, information associated with an administrative user interaction in association with the self-checkout session, wherein the administrative user interaction is an administrative transaction that is not available to be performed at the guest user mobile computing device;
    process the information associated with the administrative user interaction, wherein processing the information associated with the administrative user interaction causes the state of the self-checkout cart instance to be updated;
    update the user interface displayed on the self-checkout POS device based on the updated state of the self-checkout cart instance;
    determine that the self-checkout cart instance is completed; and
    terminate the self-checkout session.

2. The system of claim 1, wherein the system is further operative to provide the information associated with the updated state of the self-checkout cart instance to the guest user mobile computing device for enabling the guest user mobile computing device to update a user interface displayed on the guest user mobile computing device based on the updated state of the self-checkout cart instance, the user interface displayed on the guest user mobile device thereby representing the updated state of the self-checkout cart instance concurrently with the user interface displayed on the self-checkout POS device.

3. The system of claim 2, wherein the system is further operative to provide the information associated with the state of the self-checkout cart instance to the administrator user mobile computing device, the administrator user device automatically updating an administrator user interface in response to receiving the information to display at least one graphical option that is not displayed on the user interface of the guest user mobile device.

4. The system of claim 1, wherein the user interaction includes a first user interaction of a self-checkout session operation that requires at least a second user interaction to complete.

5. The system of claim 4, wherein: the first user interaction is associated with adding an item to be purchased by a guest user; and the at least a second user interaction is associated with providing additional information in relation to the item.

6. The system of claim 4, wherein the system is further operative to: receive, from the guest user mobile device, information associated with the second user interaction performed at the user mobile device; provide the information associated with the second user interaction to the self-checkout POS device to be processed, wherein processing the information associated with the second user interaction causes the state of the self-checkout cart instance to be updated; and update the display of the self-checkout POS device based on the updated state of the self-checkout cart instance.

7. The system of claim 4, wherein, responsive to the second user interaction being performed at the self-checkout POS device, the system is further operative to receive, from the self-checkout POS device, information associated with an updated state of the self-checkout cart instance based on the second user interaction.

8. The system of claim 7, wherein the second user interaction includes detecting a weight of the item to be purchased using a scale included in the self-checkout POS device.

9. The system of claim 1, wherein the system comprises an orchestrator operative to manage requests and responses on the first connection.

10. The system of claim 1, wherein the system is further configured to: generate the unique coded image; apply an expiration time to the unique coded image; and if the expiration time is reached and the unique coded image has not been captured by the guest user mobile computing device, generate a new unique coded image.

11. The system of claim 1, wherein the information associated with the self-checkout POS device includes information identifying the self-checkout session, and wherein the system is further configured to: in response to termination of the self-checkout session, generate a new unique coded image.

12. The system of claim 1, wherein determining that the self-checkout cart instance is completed is based on receipt of a payment interaction at either of the guest user mobile computing device or the self-checkout POS device.

13. A method for providing remote self-checkout, comprising:
receiving an indication that a self-checkout session has been initiated at a self-checkout point-of-sale (POS) device;
creating a self-checkout cart instance associated with the self-checkout session;
displaying, on a display of the self-checkout point-of-sale (POS) device, a user interface including a unique coded image associated with the self-checkout session at the self-checkout POS device, the unique coded image comprising information associated with the self-checkout POS device and an instruction for a guest user mobile computing device, wherein the unique coded image, when captured by the guest user mobile computing device, enables the guest user mobile computing device to request a connection with the self-checkout session at the self-checkout POS device according to the instruction;
in response to receiving a first request for the connection, establishing a first connection with the guest user mobile computing device and a second connection with the self-checkout POS device based on the information associated with the self-checkout POS device;
receiving, from the self-checkout POS device, information associated with a state of the self-checkout cart instance;
providing the information associated with the state of the self-checkout cart instance to the guest user mobile computing device;
receiving, from the guest user mobile computing device, information associated with a user interaction in association with the self-checkout session;
providing the information associated with the user interaction to the self-checkout POS device to be processed, wherein processing the information associated with the user interaction causes the state of the self-checkout cart instance to be updated;
updating the user interface displayed on the self-checkout POS device based on the updated state of the self-checkout user cart instance;
in response to receiving a second request for a connection with the self-checkout session at the self-checkout POS device and in response to determining that the second request is from an administrative user mobile computing device, establishing a third connection with the administrative user mobile computing device based on information comprised in the unique coded image, wherein the unique coded image, when captured by the administrative user mobile computing device, enables the administrative user mobile computing device to request a connection with the self-checkout session at the self-checkout POS device;
providing information associated with the state of the self-checkout cart instance to the administrative user mobile computing device;
receiving, from the administrative user mobile computing device, information associated with an administrative user interaction in association with the self-checkout session, wherein the administrative user interaction is an administrative transaction that is not available to be performed at the guest user mobile computing device;
processing the information associated with the administrative user interaction, wherein processing the information associated with the administrative user interaction causes the state of the self-checkout cart instance to be updated;
updating the user interface displayed on the self-checkout POS device based on the updated state of the self-checkout cart instance;
determining that the self-checkout cart instance is completed; and
terminating the self-checkout session.

14. The method of claim 13, further comprising: providing the information associated with the updated state of the self-checkout cart instance to the guest user mobile computing device for enabling the guest user mobile computing device to update a user interface displayed on the guest user mobile computing device based on the updated state of the self-checkout cart instance, the user interface displayed on the guest user mobile device thereby representing the updated state of the self-checkout cart instance concurrently with the user interface displayed on the self-checkout POS device.

15. The method of claim 13, wherein receiving information associated with the user interaction performed at the guest user mobile computing device comprises receiving information associated with a second user interaction of a self-checkout session operation that requires at least a second user interaction to complete, wherein a first user interaction is performed at the self-checkout POS device prior to the second user interaction.

16. The method of claim 13, wherein receiving information associated with the user interaction performed at the guest user mobile computing device comprises receiving information associated with a first user interaction of a self-checkout session operation that requires at least a second user interaction to complete.

17. The method of claim 16, further comprising: receiving, from the guest user mobile device, information associated with the second user interaction performed at the user mobile device; providing the information associated with the second user interaction to the self-checkout POS device to be processed, wherein processing the information associated with the second user interaction causes the state of the self-checkout cart instance to be updated; and updating the display of the self-checkout POS device based on the updated state of the self-checkout cart instance.

18. The method of claim 17, further comprising: receiving, from the self-checkout POS device, information associated with the updated state of the self-checkout cart instance based on the second user interaction; and providing the information associated with the updated state of the self-checkout cart instance to the user mobile computing device for enabling the user mobile computing device to update a user interface displayed on the guest user mobile computing device based on the updated state of the self-checkout cart instance.

19. The method of claim 13, wherein: displaying the unique coded image further comprises generating the unique coded image; and generating the unique coded image comprises: applying an expiration time to the unique coded image; and if the expiration time is reached and the unique coded image has not been captured by the guest user mobile computing device, generating a new unique coded image.

20. A computer readable storage device that includes executable instructions which, when executed by a processor, cause the processor to provide remote self-checkout, the instructions comprising:
receiving an indication that a self-checkout session has been initiated at a self-checkout point-of-sale (POS) device;
creating a self-checkout cart instance associated with the self-checkout session;
displaying, on a display of the self-checkout point-of-sale (POS) device, a user interface including a unique coded image associated with a self-checkout session at the self-checkout POS device, the unique coded image comprising information associated with the self-checkout POS device and an instruction for a guest user mobile computing device, wherein the unique coded image, when captured by the guest user mobile computing device, enables the guest user mobile computing device to request a connection with the self-checkout session at the self-checkout POS device according to the instruction;
in response to receiving a first request for the connection, establishing a first connection with the guest user mobile computing device and a second connection with the self-checkout POS device based on the information associated with the self-checkout POS device;
receiving, from the self-checkout POS device, information associated with a state of the self-checkout instance in association with the self-checkout session;
providing the information associated with the state of the self-checkout cart instance to the guest user mobile computing device; receiving, from the guest user mobile computing device, information associated with a user interaction in association with the self-checkout session;
providing the information associated with the user interaction to the self-checkout POS device to be processed, wherein processing the information associated with the user interaction causes the state of the self-checkout cart instance to be updated;
updating the user interface displayed on the self-checkout POS device based on the updated state of the self-checkout user cart instance;
in response to receiving a second request for a connection with the self-checkout session at the self-checkout POS device and in response to determining that the second request is from an administrative user mobile computing device, establishing a third connection with the administrative user mobile computing device based on information comprised in the unique coded image, wherein the unique coded image, when captured by the administrative user mobile computing device, enables the administrative user mobile computing device to request a connection with the self-checkout session at the self-checkout POS device;
providing information associated with the state of the self-checkout cart instance to the administrative user mobile computing device;
receiving, from the administrative user mobile computing device, information associated with an administrative user interaction in association with the self-checkout session, wherein the administrative user interaction is an administrative transaction that is not available to be performed at the guest user mobile computing device;
processing the information associated with the administrative user interaction, wherein processing the information associated with the administrative user interaction causes the state of the self-checkout cart instance to be updated;
updating the user interface displayed on the self-checkout POS device based on the updated state of the self-checkout cart instance;
determining that the self-checkout cart instance is completed; and
terminating the self-checkout session.

21. The computer readable storage device of claim 20, wherein:
receiving information associated with the user interaction performed at the guest user mobile computing device comprises one of:
receiving information associated with a second user interaction of a self-checkout session operation that requires at least a second user interaction to complete, wherein a first user interaction is performed at the self-checkout POS device prior to the second user interaction; or
receiving information associated with a first user interaction of a self-checkout session operation that requires at least a second user interaction to complete; and the instructions further comprising:
receiving, from the guest user mobile device, information associated with the second user interaction performed at the guest user mobile device;
providing the information associated with the second user interaction to the self-checkout POS device to be processed, wherein processing the information associated with the second user interaction causes the state of the self-checkout cart instance to be updated; and
updating the display of the self-checkout POS device based on the updated state of the self-checkout cart instance.

* * * * *